(12) United States Patent
Okada

(10) Patent No.: US 6,442,477 B1
(45) Date of Patent: Aug. 27, 2002

(54) COMPUTER SYSTEM HAVING PCMCIA SLOT

(75) Inventor: Hiroki Okada, Fukushima (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 09/707,066

(22) Filed: Nov. 6, 2000

(30) Foreign Application Priority Data

Nov. 11, 1999 (JP) .......................................... 11-321047

(51) Int. Cl.[7] .............................................. C06F 13/00
(52) U.S. Cl. ........................ 701/208; 701/200; 340/995; 73/178 R; 395/282; 395/311
(58) Field of Search ................................ 701/208, 200, 701/213; 340/990, 998, 995; 73/178 R; 395/282, 311, 281, 828, 882

(56) References Cited

U.S. PATENT DOCUMENTS 5,826,044 A * 10/1998 Zenda ........................ 395/282
5,907,686 A 5/1999 Zenda ........................ 395/282
5,922,040 A * 7/1999 Prabhakaran ................ 701/117

* cited by examiner

*Primary Examiner*—William A. Cuchlinski, Jr.
*Assistant Examiner*—Arthur D. Donnelly
(74) *Attorney, Agent, or Firm*—Brinks Hofer Gilson & Lione

(57) ABSTRACT

A PCMCIA control unit for a computer system is connected to the common bus, and the PCMCIA control unit latches addresses, read data, and write data. Access to a PCMCIA card is made through this PCMCIA control unit. Data communication between the PCMCIA control unit and the PCMCIA card is carried out by a local bus. Further, inside the PCMCIA control unit are held data that indicate the operation state of the PCMCIA card, so that the CPU is able to detect whether a data write into the PCMCIA card or a data read from the PCMCIA card is completed or not. Thus, the invention provides a computer system having a PCMCIA slot that does not create deficiencies of display even when part of a work memory is used as a frame buffer, and reduces the cost.

20 Claims, 5 Drawing Sheets

NAVIGATION SYSTEM (EMBODIMENT)

NAVIGATION SYSTEM (EMBODIMENT)

CONFIGURATION OF PCMCIA CONTROL UNIT

NAVIGATION SYSTEM (CONVENTIONAL)

TIMING CHART DURING DATA READ

COMPUTER SYSTEM HAVING PCMCIA SLOT

BACKGROUND OF THE INVENTION

1. Field of the Invention

The present invention relates generally to a computer system having a PCMCIA (Personal Computer Memory Card International Association) slot in which a PCMCIA card is inserted, and specifically to a computer system employing the UMA (Unified Memory Architecture) technique that uses part of a work memory as a frame buffer (graphic memory).

2. Related Art

With the recent advancement in computer technology, computers have been utilized in various fields. In a car navigation system, for example, GPS (Global Positioning System) and computer technologies are utilized. The car navigation system displays a map and the current position of a vehicle on an LCD display and guides the vehicle to a destination, thereby allowing a driver to enjoy comfortable and safe driving without taking a wrong course in local areas of first visit.

FIG. 4 is a block diagram illustrating a configuration of a conventional car navigation system.

The car navigation system includes a CPU (Central Processing Unit) 41, a map data storage unit 42, a GPS receiver 43, a program memory 44, a work memory 45, a display control unit 46, a frame buffer 47, a monitor 48, and a PCMCIA slot 49. The CPU 41, map data storage unit 42, GPS receiver 43, program memory 44, work memory 45, display control unit 46, and PCMCIA slot 49 are mutually connected through a common bus 40.

The map data storage unit 42 comprises a CD-ROM or a DVD-M, on which is stored the map data, and a drive unit for the ROM. The GPS receiver 43 detects a current position (longitude and latitude) of the vehicle by means of a signal transmitted from the GPS satellite. The CPU 41 corrects the position detected by the GPS receiver 43 by using a signal outputted from a vehicle sensor (a sensor that detects the travel distance, travel speed, rotational angle, etc., which is not illustrated), and detects the current position of the vehicle with a higher accuracy.

The program memory 44 stores the programs for the navigation system to perform navigation (route guidance), and the CPU 41 executes various processing in accordance with the programs. The work memory 45 includes a DRAM that temporarily stores various data while the CPU 41 executes the programs.

The display control unit 46 generates images to be displayed on the monitor 48. For example, the CPU 41 reads map data of an area surrounding the current position of the vehicle from the map data storage unit 42, and transfers the data to the display control unit 46. The display control unit 46 generates image data (map image, etc.) in the frame buffer 47 on the basis of the map data transferred, and reads the image data from the frame buffer 47 at a specific timing to output to the monitor 48. Thus, the map image is displayed on the monitor 48.

In the PCMCIA slot 49 is inserted a card conforming to the PCMCIA standard (called the PCMCIA card), as needed. The PCMCIA card 50 can include a memory card, a modem card, etc. The memory card can record, for example, the data that illustrate a travel locus of a vehicle, the positions of sites that a user has voluntarily set, and the information (specific marks and comments, etc.) that are associated with the sites.

Further, it is also possible to insert a memory card that bears an upgrade program in the PCMCIA slot 49 to thereby upgrade the program recorded in the program memory 44 and add a new function. Further, it is also possible to use the memory card inserted in the PCMCIA slot 49 as a work memory to thereby enhance the processing speed.

Further, in case a modem card is inserted in the PCMCIA slot 49, the modem card with a portable telephone connected thereto will allow a user to communicate with persons or facilities outside the vehicle. For example, it will become possible to connect with the Internet and transmit and receive mail, or to connect with a traffic information center and receive the most recent traffic information.

Currently, the memory capacity required for the frame buffer 47 is about 1 M to 2 M bytes, which is relatively low. However, the capacity of memory ICs being marketed has been increasing every year, and the memory IC of a low capacity necessary for the frame buffer 47 is becoming difficult to procure. If a large capacity memory IC is used for the frame buffer 47, it will be wasteful, and the cost per bit will become expensive. For example, if a 64 M bit DRAM is used, one memory IC will bear a memory capacity of 8 M bytes, and only about ¼ of the memory capacity will be used.

Recently, a technique has been developed which uses part of the work memory as a frame buffer. This is the so-called UMA technique, which does not need to provide a memory IC exclusive for the frame buffer, and the use of the UMA technique can reduce the cost of a computer system accordingly. However, it is difficult to apply the UMA technique to a computer system that allows a connection of a PCMCIA card.

FIG. 5 is a timing chart illustrating the operation of a conventional computer system loaded with a PCMCIA card. In the PCMCIA standard, in the case of a CPU accessing a PCMCIA card, when the wait signal that the PCMCIA card outputs becomes active ("High" in FIG. 5), the CPU needs to delay the termination of the memory access cycle by extending the bus cycle. The CPU, waiting for the wait signal to become non-active, reads data from the PCMCIA card. While the wait signal is active, the common bus is occupied by the PCMCIA card, and there inevitably occurs a waiting time of maximum 12 μsec. Accordingly, it will become impossible to transfer image data between the frame buffer in the work memory and the display control unit.

Although it is conceivable to provide the display control unit with a buffer for storing data for more than 12 μsec, it will result in an increased cost, which detracts from the advantage of employing the UMA technique.

Thus, it is an object of the invention to provide a computer system having a PCMCIA slot that does not create deficiencies of display even when part of a work memory is used as a frame buffer and permits a cost reduction thereof.

Further, it is another object of the invention to provide a car navigation system that has a PCMCIA slot to facilitate functional expansions and permits a cost reduction by employing the UMA technique.

BRIEF SUMMARY OF THE INVENTION

In order to accomplish the foregoing objects, the invention provides a computer system comprising: an operational processing unit; a PCMCIA slot in which a PCMCIA card can be inserted; a PCMCIA control unit connected with the PCMCIA slot; a work memory in which data are stored in accordance with operations of the operational processing unit; a display control unit that uses part of the work memory as a graphic memory and generates image data; and a common bus that is commonly connected to the operational processing unit, the PCMCIA control unit, the work memory, and the display control unit. In this configuration, the PCMCIA card control unit comprises: an address latch unit that latches an address transferred through the common bus; a write data latch unit that latches write data transferred through the common bus; a re ad data latch unit that latches re ad data transferred from the PCMCIA card; and an operation state signal output unit that outputs a signal indicating an operation state of the PCMCIA card.

In the computer system according to the invention, the PCMCIA control unit is connected between the common bus and the PCMCIA slot, and the PCMCIA control unit latches addresses, read data, and write data. At the moment that the PCMCIA card completes the preparation for the data read or data write, the PCMCIA control unit executes the data read or data write to the PCMCIA card. Further, since the operation state signal output unit of the PCMCIA control unit outputs a signal that indicates the operation state of the PCMCIA card, the operational processing unit is able to detect whether a data write into the PCMCIA card or a data read from the PCMCIA card is completed or not, by checking the signal outputted from the operation state signal output unit.

Thus, in the computer system according to the invention, since the PCMCIA control unit latches the addresses, read data, and write data, the bus cycle is not needed to be extended, and the computer system is able to reduce the time for which the PCMCIA card occupies the common bus.

Therefore, even when part of the work memory is used as a graphic memory, it becomes possible to access the work memory for the image data at a specific timing. Thereby, a memory IC exclusive for the graphic memory becomes unnecessary, which reduces the cost of a device using a computer such as a car navigation system, etc.

DETAILED DESCRIPTION OF THE INVENTION

A preferred embodiment will be described with reference to the accompanying drawings.

Figure 1:
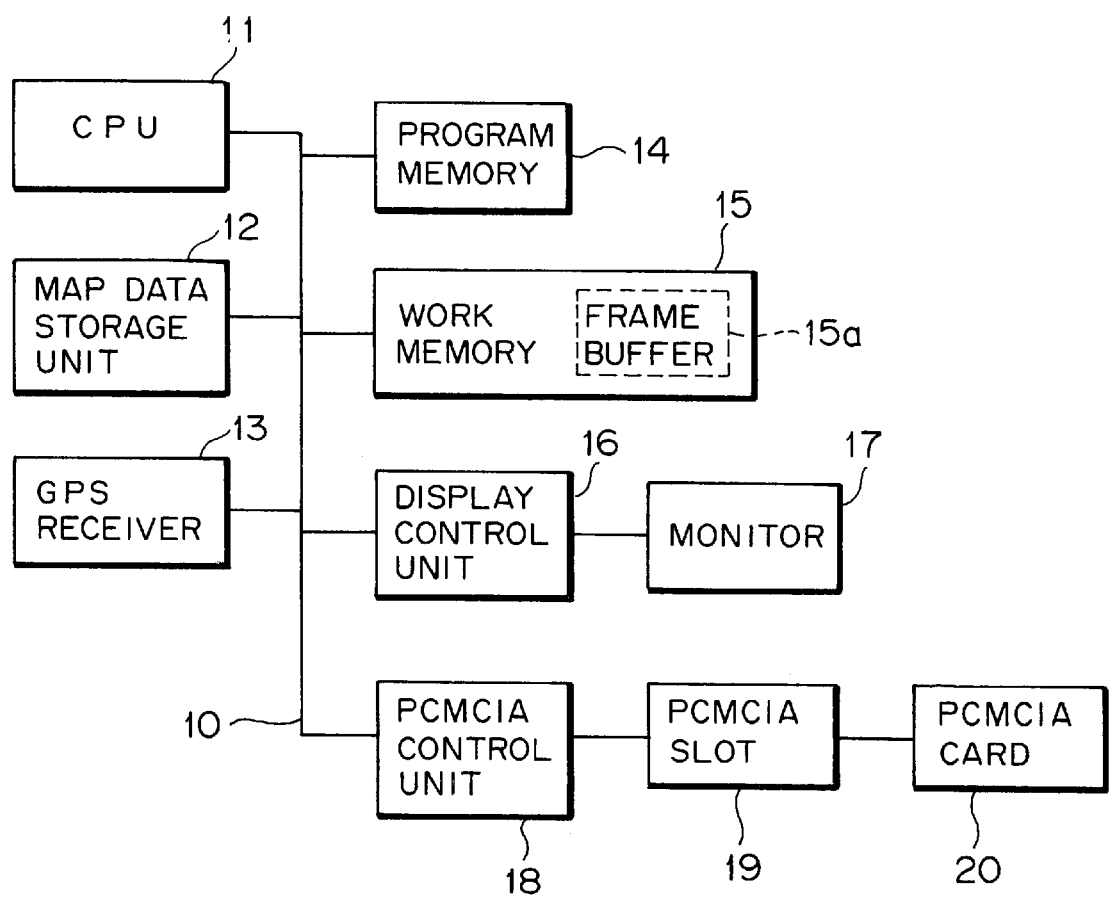
FIG. 1 is a block diagram illustrating a configuration of one embodiment of a car navigation system (computer system) according to the present invention.

FIG. 1 illustrates a configuration of one embodiment of a car navigation system (computer system) according to the present invention. The navigation system in this embodiment includes a CPU (operational processing unit) 11, a map data storage unit 12, a GPS receiver (vehicle position detection means) 13, a program memory 14, a work memory 15, a display control unit 16, a monitor 17, a PCMCIA control unit 18, and a PCMCIA slot 19.

The CPU 11, map data storage unit 12, GPS receiver 13, program memory 14, work memory 15, display control unit 16, and PCMCIA control unit 18 are mutually connected by a common bus 10. Here, the common bus 10 includes the address bus and the data bus.

The map data storage unit 12 comprises a CD-ROM or a DVD-ROM for storing the map data and a drive unit for the ROM. The GPS receiver 13 detects the current position of the vehicle by means of a signal transmitted from the GPS satellite. The CPU 11 corrects the position detected by the GPS receiver 13 by using a signal outputted from a vehicle sensor (a sensor that detects the travel distance, travel speed, rotational angle, etc., which is not illustrated), and detects the current position of the vehicle with a higher accuracy.

The program memory 14 stores the programs that are used in the car navigation system, and the CPU 11 executes various processes in accordance with the programs. The work memory 15 includes a DRAM that temporarily stores various data while the CPU 11 executes the programs. This embodiment employs the UMA technique, and the work memory 15 spares an area of about 1 M to 2 M bytes for a frame buffer (graphic memory) 15a.

The display control unit 16 generates image data based on the data transferred through the common bus 10, stores the image data in the frame buffer 15a *inside the work memory 15, and reads the image data from the frame buffer 15a* at a specific timing to transfer to the monitor 17. Thus, the map image is displayed on the monitor 17.

The PCMCIA slot 19 is loaded with a PCMCIA card 20 such as a memory card or a modem card, as needed. The PCMCIA control unit 18 is connected between the PCMCIA slot 19 and the common bus 10 to bridge these two, and latches an address when accessing the PCMCIA card 20, or latches data to write in the PCMCIA card 20 or data read from the PCMCIA card 20.

Figure 2:
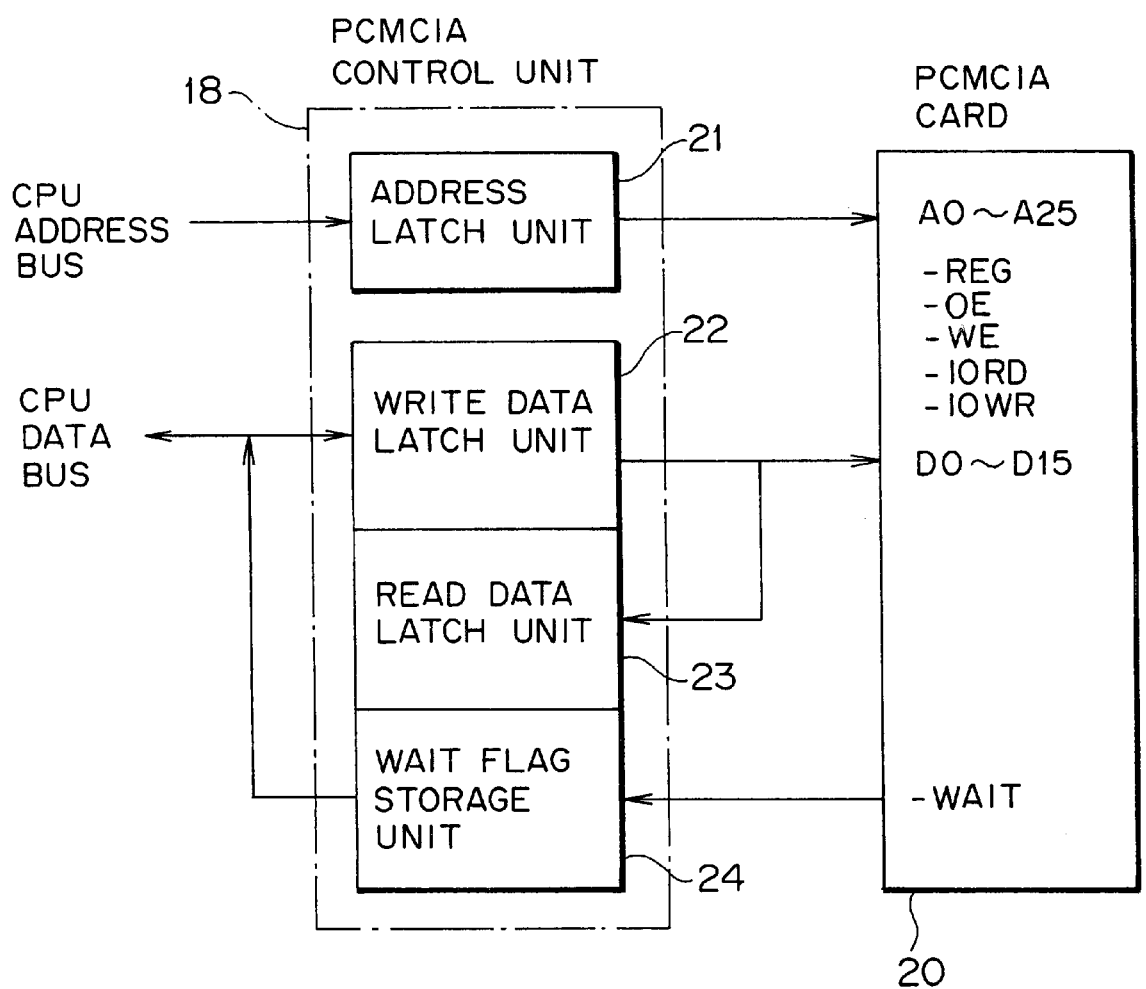
FIG. 2 is a block diagram illustrating a configuration of the PCMCIA control unit in the embodiment.

FIG. 2 illustrates a configuration of the PCMCIA control unit 18. As shown in FIG. 2, the PCMCIA control unit 18 includes an address latch unit 21, a write data latch unit 22, a read data latch unit 23, and a wait flag storage unit (operational state signal output unit) 24. The address latch unit 21 is connected to address buses A0 through A25 of the common bus 10, and latches addresses outputted when the CPU 11 executes data write or data read into or from the PCMCIA card 20. The write data latch unit 22 is connected to data buses D0 through D15 of the common bus 10, and latches data to be written in the PCMCIA card 20 (write data). The read data latch unit 23 is also connected to the data buses D0 through D15, and latches data read from the PCMCIA card 20 (read data).

The wait flag storage unit 24 holds a wait state-WAIT outputted from the PCMCIA card 20 to output to the CPU 11 through the data bus. Further, the other signals inputted and outputted to and from the PCMCIA card 20, for example, the attribute memory space select signal-REG, output enable signal-OE, write enable signal-WE, I/O read signal-IORD, and I/O write signal-IOWR, etc., are also transferred to the CPU 11 or the PCMCIA card 20 through the PCMCIA control unit 18. That is, in this embodiment, the communication between the PCMCIA control unit 18 and the PCMCIA card 20 is made through a local bus.

Figure 3:
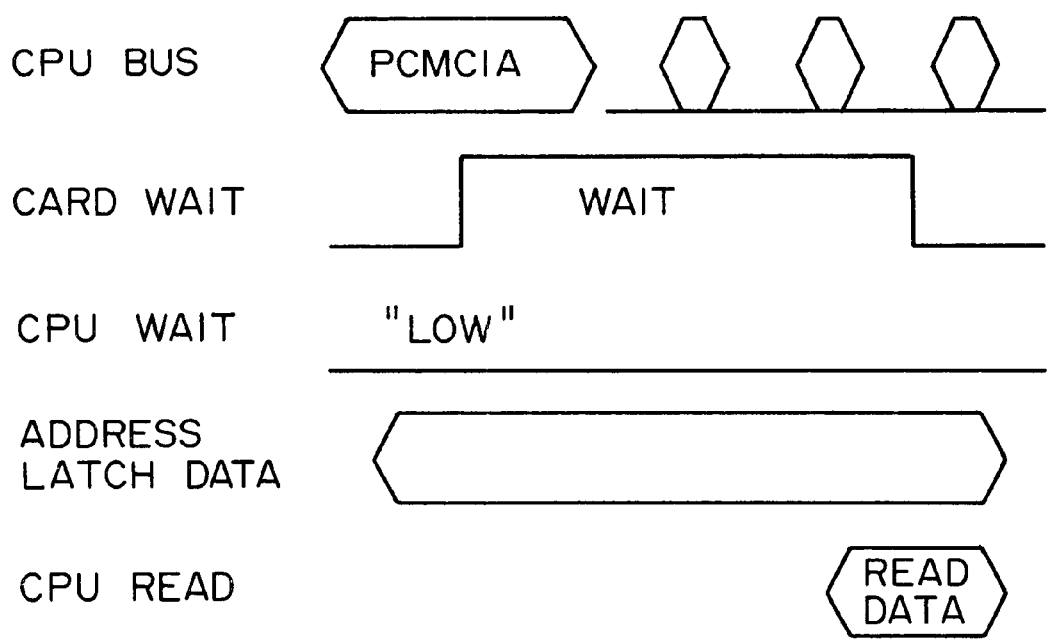
FIG. 3 is a timing chart illustrating the operation during data read from the PCMCIA card in the embodiment.
Figure 4:
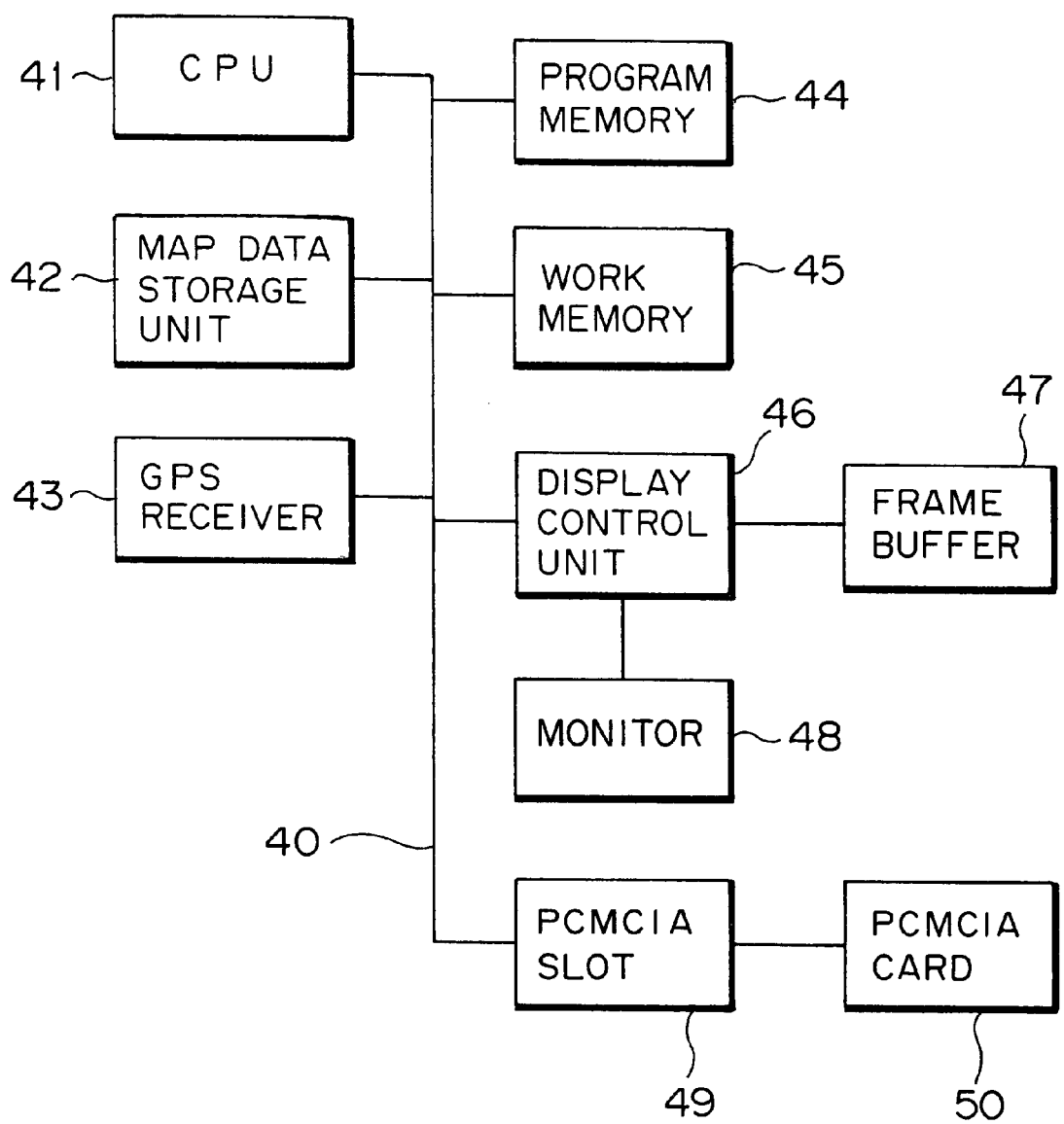
FIG. 4 is a block diagram illustrating a configuration of a conventional car navigation system (computer system)
Figure 5:
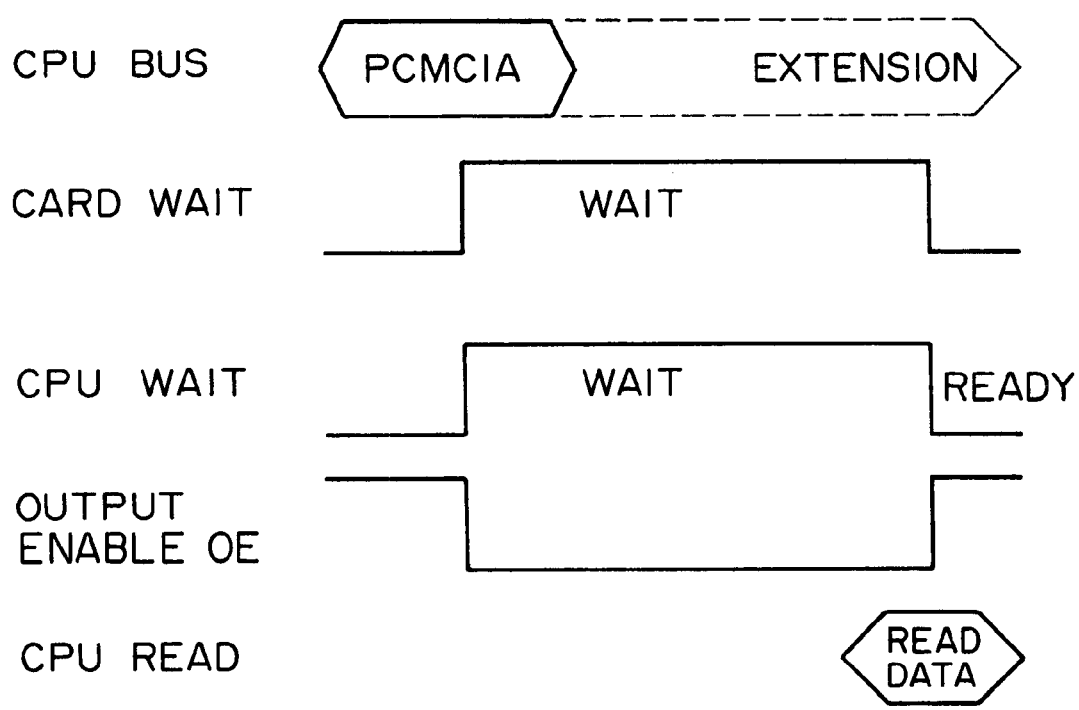
FIG. 5 is a timing chart illustrating the operation of the conventional computer system loaded with the PCMCIA card.

FIG. 3 is a timing chart illustrating the operation during data read from the PCMCIA card 20. When the CPU 11 reads data from the PCMCIA card 20, the CPU 11 outputs an address to the address bus. Thereafter, the CPU 11 makes the PCMCIA card 20 occupy the common bus 10 only for a specific time (bus cycle). The PCMCIA control unit 18 latches the address received through the common bus 10 in the address latch unit 21, and transfers the address to the PCMCIA card 20. Thereby, a wait signal-WAIT outputted from the PCMCIA card 20 becomes active ("Low"), and the wait flag storage unit 24 of the PCMCIA control unit 18 holds "High" as the wait signal.

Thereafter, not executing a bus extension, the CPU 11 releases the common bus 10 to the other devices, as a specific time passes. Therefore, it becomes possible for the display control unit 16 to access the frame buffer 15a inside the work memory 15, and transfer display data to the monitor 17 at a specific timing. Thus, in this embodiment, since the CPU 11 does not execute the bus extension when accessing the PCMCIA card 20, the common bus 10 is released in a short time, and other control and operational processing become possible. Thereby, the throughput of the CPU 11 will not be diminished.

Until data is outputted from the PCMCIA card 20, the CPU 11 checks the state of the wait flag storage unit 24 of the PCMCIA control unit 18 at a specific timing. If the state of the wait flag storage unit 24 is "High", it shows that a data read from the PCMCIA card 20 is not completed, and the CPU 11 will execute other processing.

When the PCMCIA card 20 reaches the state that data can be outputted from a set address, the PCMCIA card 20 turns the wait signal-WAIT into "High". As the wait signal-WAIT is turned into "High", the PCMCIA control unit 18 turns the state of the wait flag storage unit 24 into "Low", reads the data from the PCMCIA card 20, and latches the data in the read data latch unit 23.

The CPU 11 checks the state of the PCMCIA control unit 18 at the specific timing, and if the state of the wait flag storage unit 24 is "Low", the CPU 11 will read data from the read data latch unit 23 of the PCMCIA control unit 18. Thereby, the data read from the PCMCIA card 20 is completed.

On the other hand, the operation during data write is as follows. The CPU 11 outputs a write address to the address bus, and requests a data write to the PCMCIA card 20. Thereafter, the CPU 11 makes the PCMCIA card 20 occupy the common bus 10 only for a specific time. The PCMCIA control unit 18 latches the address transferred from the CPU 11 in the address latch unit 21, and requests a data write to the PCMCIA card 20. Receiving the data write request, the PCMCIA card 20 turns the wait signal-WAIT into "Low". Thereby, the wait flag storage unit 24 of the PCMCIA control unit 18 stores "High" as the wait signal.

The write data outputted from the CPU 11 through the data bus are latched by the write data latch unit 22 of the PCMCIA control unit 18. The CPU 11 releases the bus occupation to the PCMCIA card 20 as a certain time passes, and executes other processing. And, in the same manner as in the data read, the CPU 11 checks the state of the wait flag storage unit 24 of the PCMCIA control unit 18 at the specific timing, and checks to see if the data write is completed or not.

The PCMCIA control unit 18 outputs the address and write data to the PCMCIA card 20. When completing the data write, the PCMCIA card 20 turns the wait signal-WAIT into "High". Thereby, the wait flag storage unit 24 of the PCMCIA control unit 18 is turned into "Low". As the state of the wait flag storage unit 24 turns into "Low", the CPU 11 detects that the data write into the PCMCIA card 20 is finished.

As described above, this embodiment includes the PCMCIA control unit 18, and executes the communication between the PCMCIA control unit 18 and the PCMCIA slot 19 through a local bus. Further, the PCMCIA control unit 18 latches addresses, read data, and write data, whereby the access to the PCMCIA card 20 can be implemented without extension of the bus cycle. Thereby, this embodiment is able to reduce the time for which the common bus 10 is occupied by the PCMCIA card 20. Therefore, in the case of using part of the work memory 15 as the frame buffer 15a to employ the UMA technique, the display control unit 16 is able to access the frame buffer 15a inside the work memory 15 without a delay in timing.

This embodiment permits the UMA technique to be employed in a computer system having a PCMCIA slot, and thereby reduces the cost of a device that uses a computer, such as a car navigation system or the like.

Further, this embodiment assumes a case in which the wait signal-WAIT is held in the wait flag storage unit 24, and the CPU 11 checks the state of the wait flag storage unit 24 through the data bus. However, the wait signal-WAIT may be designed to be transferred directly to the wait terminal of the CPU 11 through the PCMCIA control unit 18. In this case, the CPU 11 can dispense with extending the bus, even when the CPU 11 receives the wait signal-WAIT from the PCMCIA card 20.

According to the invention thus described, since a PCMCIA control unit is installed, and the PCMCIA control unit latches addresses, read data, and write data, the access to the PCMCIA card does not need to extend the bus cycle. Therefore, part of the work memory can be used as the frame buffer for display, whereby the cost of a device that applies a computer such as a car navigation system or the like can be reduced. Also, since it can be avoided that the common bus is occupied for a long time by the PCMCIA card, the throughput of the operational processing unit will not be diminished.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A computer system comprising:

an operational processing unit;

a slot in which a card can be inserted;

a card control unit connected with the slot;

a work memory in which data are stored in accordance with operations of the operational processing unit;

a display control unit that uses part of the work memory as a graphic memory, and generates image data; and a common bus that is commonly connected to the operational processing unit, the card control unit, the work memory, and the display control unit.

2. A computer system as claimed in claim 1, wherein the card to be inserted in the slot is a PCMCIA card.

3. A computer system as claimed in claim 1, wherein data communication between the card control unit and the card is carried out by a local bus.

4. A computer system as claimed in claim 1, further comprising a map data storage unit and a vehicle position detection means that are connected to the common bus.

5. A computer system as claimed in claim 1, wherein the card to be inserted in the slot is a memory card.

6. A computer system as claimed in claim 1, wherein the card to be inserted in the slot is a modem card that enables outside communication by connecting the modem card with a portable telephone.

7. A computer system as claimed in claim 1, wherein the card control unit comprises:
- an address latch unit that latches an address transferred through the common bus;
- a write data latch unit that latches write data transferred through the common bus;
- a read data latch unit that latches read data transferred from the card; and
- an operation state signal output unit that outputs a signal indicating an operation state of the card.

8. A computer system as claimed in claim 1, further comprising a monitor that displays the image data.

9. A computer system comprising:
- an operational processing unit;
- a PCMCIA slot in which a PCMCIA card can be inserted;
- a PCMCIA control unit connected with the PCMCIA slot;
- a work memory in which data are stored in accordance with operations of the operational processing unit;
- a display control unit that uses part of the work memory as a graphic memory, and generates image data; and
- a common bus that is commonly connected to the operational processing unit, the PCMCIA control unit, the work memory, and the display control unit, wherein the PCMCIA card control unit comprises:
  - an address latch unit that latches an address transferred through the common bus;
  - a write data latch unit that latches write data transferred through the common bus;
  - a read data latch unit that latches read data transferred from the PCMCIA card; and
  - an operation state signal output unit that outputs a signal indicating an operation state of the PCMCIA card.

10. A computer system as claimed in claim 9, wherein the operational processing unit reads the read data from the read data latch unit in accordance with a signal outputted from the operation state signal output unit.

11. A computer system as claimed in claim 9, further comprising a map data storage unit and a vehicle position detection means that are connected to the common bus.

12. A computer system as claimed in claim 9, wherein the PCMCIA card to be inserted in the PCMCIA slot is a memory card.

13. A computer system as claimed in claim 9, wherein the PCMCIA card to be inserted in the PCMCIA slot is a modem card that enables outside communication by connecting the modem card with a portable telephone.

14. A computer system as claimed in claim 9, further comprising a monitor that displays the image data.

15. A vehicle navigation system comprising:
- an operational processing unit;
- a PCMCIA slot in which a PCMCIA card can be inserted;
- a PCMCIA control unit connected with the PCMCIA slot;
- a work memory in which data are stored in accordance with operations of the operational processing unit;
- a display control unit that uses part of the work memory as a frame buffer, and generates image data;
- a map data storage unit that stores map data;
- a vehicle position detection means that detects a current position of a vehicle; and
- a common bus that is commonly connected to the operational processing unit, the PCMCIA control unit, the work memory, the display control unit, the map data storage unit, and the vehicle position detection means, wherein the PCMCIA card control unit comprises:
  - an address latch unit that latches an address transferred through the common bus;
  - a write data latch unit that latches write data transferred through the common bus;
  - a read data latch unit that latches read data transferred from the PCMCIA card; and
  - an operation state signal output unit that outputs a signal indicating an operation state of the PCMCIA card.

16. A vehicle navigation system as claimed in claim 15, wherein the operational processing unit reads the read data from the read data latch unit in accordance with a signal outputted from the operation state signal output unit.

17. A vehicle navigation system as claimed in claim 15, wherein the PCMCIA card to be inserted in the PCMCIA slot is a memory card.

18. A vehicle navigation system as claimed in claim 15, wherein the PCMCIA card to be inserted in the PCMCIA slot is a modem card that enables outside communication by connecting the modem card with a portable telephone.

19. A navigation system as claimed in claim 15, wherein the work memory comprises a DRAM.

20. A vehicle navigation system as claimed in claim 15, further comprising a monitor that displays the image data.

* * * * *